United States Patent
Hawkins (10) Patent No.: US 7,058,703 B2
(45) Date of Patent: Jun. 6, 2006

(54) SYSTEM MANAGEMENT CONTROLLER (SMC) NEGOTIATION PROTOCOL FOR DETERMINING THE OPERATIONAL MODE OF SMCS

(75) Inventor: Peter A. Hawkins, San Luis Obispo, CA (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 10/092,793

(22) Filed: Mar. 8, 2002

(65) Prior Publication Data
US 2003/0182483 A1 Sep. 25, 2003

(51) Int. Cl.
G06F 15/177 (2006.01)
G06F 15/16 (2006.01)

(52) U.S. Cl. .................. 709/220; 709/208; 709/209; 709/250; 710/8; 710/14

(58) Field of Classification Search ........ 709/208–209, 709/220, 230, 221–223, 250; 370/359, 419, 370/463; 710/8–12, 14–18; 714/9, 11–13
See application file for complete search history.

(56) References Cited

U.S. PATENT DOCUMENTS

| | | | | |
|---|---|---|---|---|
| 4,141,066 A | | 2/1979 | Keiles | 364/119 |
| 5,644,700 A | * | 7/1997 | Dickson et al. | 714/9 |
| 5,956,337 A | * | 9/1999 | Gaddis | 370/395.1 |
| 6,067,585 A | * | 5/2000 | Hoang | 710/11 |
| 6,085,333 A | * | 7/2000 | DeKoning et al. | 714/7 |
| 6,490,255 B1 | * | 12/2002 | Kiriha et al. | 709/220 |
| 6,502,144 B1 | * | 12/2002 | Accarie | 710/8 |
| 6,810,418 B1 | * | 10/2004 | Shah et al. | 709/223 |
| 6,823,397 B1 | * | 11/2004 | Rawson, III | 709/222 |
| 6,920,554 B1 | * | 7/2005 | Rawson, III | 709/221 |
| 6,948,008 B1 | * | 9/2005 | Hawkins et al. | 710/15 |

FOREIGN PATENT DOCUMENTS

EP 0 478 294 4/1992

OTHER PUBLICATIONS

Sun Microsystems, Presentation to the PICMG 2.13 Working Group, "Managed Redundant System Slot Operations," no date.

Intel Corp., Hewlett-Packard Co., NEC Corp., Dell Computer Corp., "IPMI: Intelligent Platform Management Interface Specification", v1.5, Document Revision 1.0, Chapters 1-3, pp. 1-29, Feb. 21, 2001.

Intel Corp., product description: "Intel® NetStructure™ ZT 7101 Chassis Management Module", 2001.

Intel Corporation, Presentation to the PICMG Working Group, "Proposal for RASM Sub Team Consideration", 2001.

(Continued)

Primary Examiner—Bharat Barot
(74) Attorney, Agent, or Firm—Grossmann Tucker, Perreault & Pfleger, PLLC (57) ABSTRACT

A computer system module includes a system management controller to negotiate with other system management controllers to determine the controller's initial operational state. In an embodiment, negotiation with other system management controllers is based at least in part on one of controller capability, user configured preference, module type, and geographical address.

9 Claims, 6 Drawing Sheets

OTHER PUBLICATIONS

System Management Bus (SMBus) Specification, Version 2.0, SBS Implementers Forum, Aug. 3, 2000.
"The I²C Faq", The I2C Faq On-Line; ping.be/~ping0751/i2cfaq/, no date.
U.S. Appl. No. 10/094,629, filed Mar. 12, 2002.
U.S. Appl. No. 10/014,904, filed Dec. 14, 2001.
Herz M: *Remote system management principles*, Proceedings IEEE International Conference on Cluster Computing, Cluster 2000, Chemnitz, Germany, Nov. 28-Dec. 1, 2000, pp. 137-138, Los Alamitos, CA.

* cited by examiner

SYSTEM MANAGEMENT CONTROLLER (SMC) NEGOTIATION PROTOCOL FOR DETERMINING THE OPERATIONAL MODE OF SMCS

FIELD OF THE INVENTION

Embodiments of the present invention relate to system management. In particular, embodiments of the present invention relate to a negotiation protocol for determining the operational mode of system management controllers.

BACKGROUND

Computers and other electronic systems contains various components that may malfunction during the life of the system. In order to reduce and/or remedy such malfunctions, some systems include built-in features such as the ability to monitor and control the "health" or performance of the system hardware. Such features are sometimes referred to as system management, but also may be referred to by other names such as management, hardware management, platform management, etc. System management features may include, for example, the monitoring of elements such as temperatures, voltages, fans, power supplies, bus errors, system physical security, etc. In addition, system management features may also include determining information that helps identify a failed hardware component, and issuing an alert specifying that a component has failed.

One of the components that may be used to handle system management functions is a system management controller (also referred to herein as a "controller"). A system management controller may be a microprocessor, micro-controller, application specific integrated circuit (ASIC), or other type of processing unit that controls system management tasks. A system management controller may perform tasks such as receiving system management information, sending messages to control system performance, logging system management information, etc. For example, a management controller may receive an indication from a temperature sensor that system temperature is rising, may send a command to increase fan speed, and may log the temperature reading.

One of the management controllers in a system may perform the role of the central system management controller and perform central management functions such as for example logging events, collecting field replaceable unit (FRU) inventory information, user interface, host CPU interface, etc. The central management controller for a system may be referred to as the baseboard management controller (BMC) for the system. Other non-central management controllers may be referred to as satellite management controllers (SMCs). An SMC may perform system management for a particular part or feature of a system. For example, a computer system may contain a number of circuit boards and other components that are connected by busses, with one board containing a BMC for that system and other boards containing SMCs that performs other system management functions.

Some system management controllers have the ability to operate in a BMC mode or in an SMC mode (i.e., to perform in the role of a BMC or an SMC). In some prior systems, a system management controller that is attached to a circuit board may adapt its functionality based on the slot in which that board is inserted. In such a system, a specific slot in a system chassis may be reserved for a board that performs the BMC functionality for that system and may have a pin that provides such an indication to the resident module. In this case, a system management controller may determine upon reset if it is in the BMC slot, and if so may set itself to act as the BMC (i.e., set itself to BMC mode). In such systems, a person assembling the system or changing circuit boards may need to determine which slot is the BMC slot and to ensure that a board with desired BMC capabilities is placed in the appropriate BMC slot.

DETAILED DESCRIPTION

According to embodiments of the present invention, a system management controller negotiates with other system management controllers to determine an initial operational mode (e.g., the mode after a reset or other initiation). Such negotiation may be accomplished, for example, by sending messages between system management controllers. In an embodiment, a system management controller determines after a reset that its initial operational mode is central management controller mode (e.g., BMC mode) based upon the lack of a response to one or more controller mode requests sent by that system management controller. In another embodiment, the initial mode for the system management controller may be based upon the content of a response received by that system management controller.

Embodiments of the present invention provide a controller mode negotiation protocol. In an embodiment, each system management controller in the system is adapted to perform the negotiation protocol. The negotiation protocol may be performed for events such as system initiation or when a single system management controller performs a reset. For example, when a system is powered on, each system management controller in the system may send a controller mode request to other system management controllers according to the negotiation protocol, and may transition to an initial mode based upon a response to the controller mode request. The negotiation protocol may also define the protocol for a system management controller to respond to a mode request that it receives. In embodiments of the present invention, controllers transition through a series of negotiation states which may include: request, wait, SMC, standby BMC, and active BMC. In embodiments, the negotiation may be based at least in part on criteria such as controller capability, user configured preference, module type, and geographic (physical) address.

Figure 1:
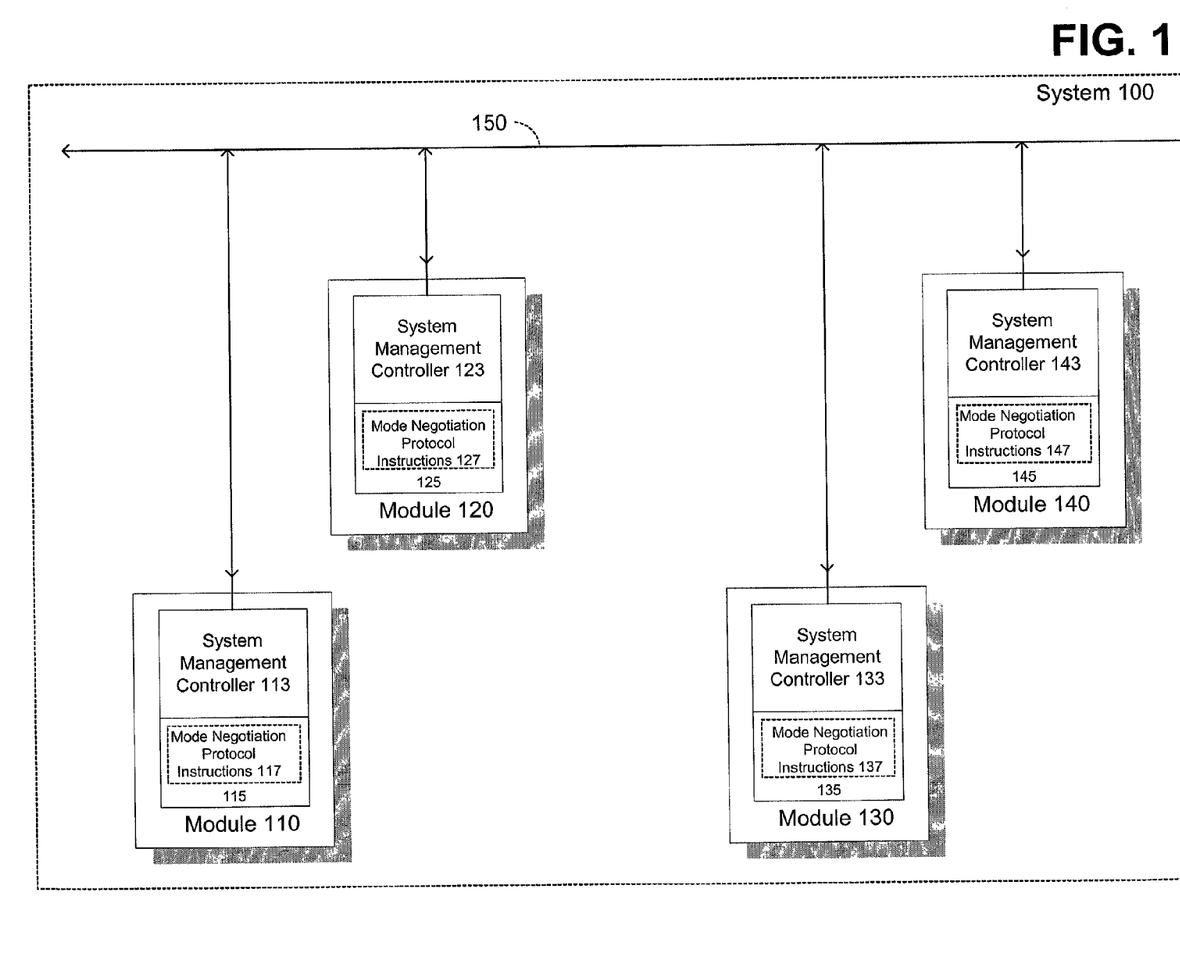
FIG. 1 is a block diagram of a system with management controllers that are adapted to perform a mode negotiation protocol according to an embodiment of the present invention.

FIG. 1 is a block diagram of a system with management controllers that are adapted to perform a mode negotiation protocol according to an embodiment of the present invention. FIG. 1 shows a system 100 that may be any type of electronic system such as a general purpose computer system, special purpose computer system, etc. System 100 contains four modules 110, 120, 130, and 140 which may be, for example, circuit boards that are inserted into slots of a system chassis. Of course, in other embodiments the system may contain more or less modules. Each of modules 110, 120, 130, and 140 may be a power supply, fan tray, CPU Board, or any other type of component. The controllers in system 100 may each by coupled through an input/output port to a system management bus 150, which may be any type of bus that carries management information. Example of system management bus 150 are an Inter-IC bus (I²C) that conforms to the I²C Bus Specification developed by Philips Semiconductor Corporation, a System Management Bus (SMBus) which conforms to the SMBus Specification (Ver. 2.0, August. 2000) of the SBS Implementers Forum, or an Intelligent Platform Management Bus (IPMB) which conforms to the Intelligent Platform Management Bus Communications Protocol Specification (Intel Corp. et al., v1.0, Nov. 15, 1999). The system management bus may be configured in any type of topology such as a single bus, star, dual bus, or a hybrid topology. If a dual bus topology is used, the system management controller may have a second input/output port to send a duplicate copy of system management messages to the other system management controllers. A system management controller may communicate with other system components using various types of message formats such as that defined in the Intelligent Platform Management Interface Specification (Intel Corp. et al., v1.5, rev. 1, Feb. 21, 2001) (herein IPMI).

Each module shown in system 100 contains a system management controller (113, 123, 133, 143) and a computer readable medium (115, 125, 135, 145). Each system management controller may be a processor that is capable of performing system management functions as discussed above. Each computer readable medium may be any type of medium capable of storing instructions, such as a read only memory (ROM), a programable read only memory (PROM), or an erasable programable read only memory (EPROM). In an embodiment, the computer readable medium is a non-volatile memory. Each computer readable medium in FIG. 1 is shown storing mode negotiation protocol instructions (117, 127, 137, 147). The mode negotiation protocol instructions may be, for example, software instructions, firmware instructions, microcode, or any other type of instructions that may be executed by the associated system management controller to negotiate with other system management controllers to determine an initial operational mode for the system management controllers. Other instructions, such as instructions to perform system management functions, may also be stored on one or more of the computer readable mediums and may be executed by a system management controller. In other embodiments, the system management controller and mode negotiation protocol instructions may be implemented as an ASIC, a programable logic array (PLA), or any other type of processing arrangement to perform system management functions.

In one example of the operation of an embodiment of the present invention, system management controller 113 may execute mode negotiation protocol instructions 117 to negotiate with system management controllers 123, 133, and 143 to determine the initial system management mode for one or more of system management controllers 113, 123, 133, and 143. In an embodiment, possible system management modes for a controller may be active-BMC mode, standby-BMC mode, and SMC mode. In this embodiment, the active BMC may perform the BMC functions for the system, while the standby-BMC may be available to become the active-BMC in case of failure of the current active-BMC (e.g., may receive and log the same management information as the active-BMC). In other embodiments, there may be more or less possible management modes.

In the simplest embodiment, which is discussed with reference to FIG. 2, all the system management controllers but one have already assumed an operational mode. In this case, the un-initialized management controller may send a mode request according to the negotiation protocol, and the other management controllers may respond according to the negotiation protocol. In another embodiment, the entire system has had an initialization or reset, and all of the system management controllers may send mode requests to one another at substantially the same time.

Figure 2:
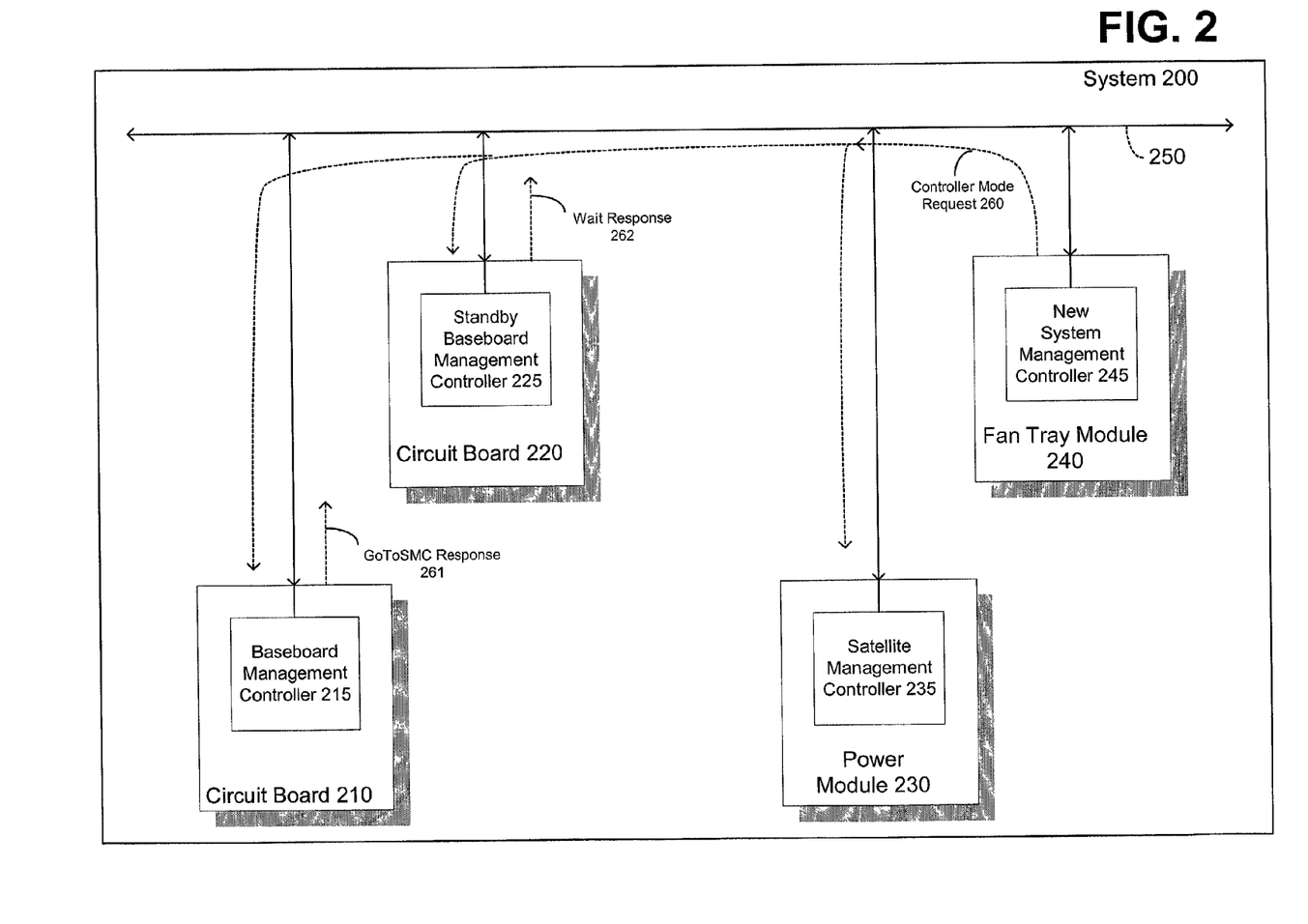
FIG. 2 is a block diagram of a system with management controllers in the process of performing a mode negotiation protocol according to an embodiment of the present invention.

FIG. 2 is a block diagram of a computer system 200 with management controllers in the process of performing a mode negotiation protocol according to an embodiment of the present invention. Computer system 200 is shown as including circuit board 210, circuit board 220, power module 230, fan tray module 240, and management bus 250 which may be the same as modules 110–140 and management bus 150 of FIG. 1. In the embodiment shown in FIG. 2, circuit board 210 includes a baseboard management controller 215, circuit board 220 includes standby management controller 225, and power module 230 contains satellite management controller 235. For the purposes of illustration, in this embodiment management controllers 215, 225, and 235 have already assumed an operational mode. For example, BMC 215 may be the active central management controller for system 200, standby BMC 225 may be ready to step in as the active central management controller for system 200 if BMC 215 should fail, and SMC 235 may monitor and control the operation of power module 230.

Management controllers, such as those shown in system 200, may be capable of operating in one, some, or all of BMC mode, standby-BMC mode, or SMC mode. For example, BMC 215 may also be capable of operating as a standby-BMC or an SMC, standby-BMC 225 may also be capable or operating as a BMC or an SMC, and SMC 235 may only be capable or operating as an SMC. In other embodiments, for example, SMC 235 may be capable of operating as BMC, and/or BMC 215 may not be capable or operating as an SMC.

Fan tray module 240 is shown as including a new system management controller 245. This controller has been labeled as "new" for the purposes of illustration to show a case where one of the system management controllers is being initialized while the other system management controllers have already assumed an operational mode. A management controller may be initialized, for example, when the entire system is turned on or reset, or (in the case of FIG. 2) when the particular module that includes the management controller is turned on or reset. FIG. 2 may illustrate the case, for example, where fan tray module 240 has been installed into system 200 as part of a hot-swap operation.

As shown in FIG. 2, during or after reset new system management controller 245 may send a controller mode request 260 over system management bus 250 to the other management controllers 215, 225, and 235. Controller mode request 260 may be, for example, a command that complies with the IPMI specification. In this embodiment, active BMC 215 responds to the controller mode request by sending a GoToSMC response 261, and standby BMC 225 responds by sending a wait response. In an embodiment, SMC 235 does not send a response to controller mode request 260. In an embodiment, and as discussed below, the response that is sent to the mode request message may be determined by the mode negotiation protocol. For example, the protocol may provide that if the active BMC receives a mode request from a management controller that has an equal or lower priority, then the active BMC will respond with a GoToSMC response. The protocol may also provide that if a standby-BMC receives a mode request from a management controller that has a higher priority, then the standby-BMC will respond with a wait response. In addition, the protocol may provide that an SMC does not respond to a mode request regardless of the relative priorities. As discussed below, factors used to determine relative priority of two management controllers may include controller capability, user configured preference, module type, and geographical address.

The negotiation protocol may also define the action taken upon receipt of a mode response (or failure to receive a mode response). For example, the protocol may provide that a controller transitions to the SMC state upon receipt of a GoToSMC command. As another example, which is discussed with reference to FIG. 3, the protocol may provide that a management controller transitions to the active BMC state if it sends out a mode request and does not receive a response within a timeout period (i.e., a threshold amount of time).

Figure 3:
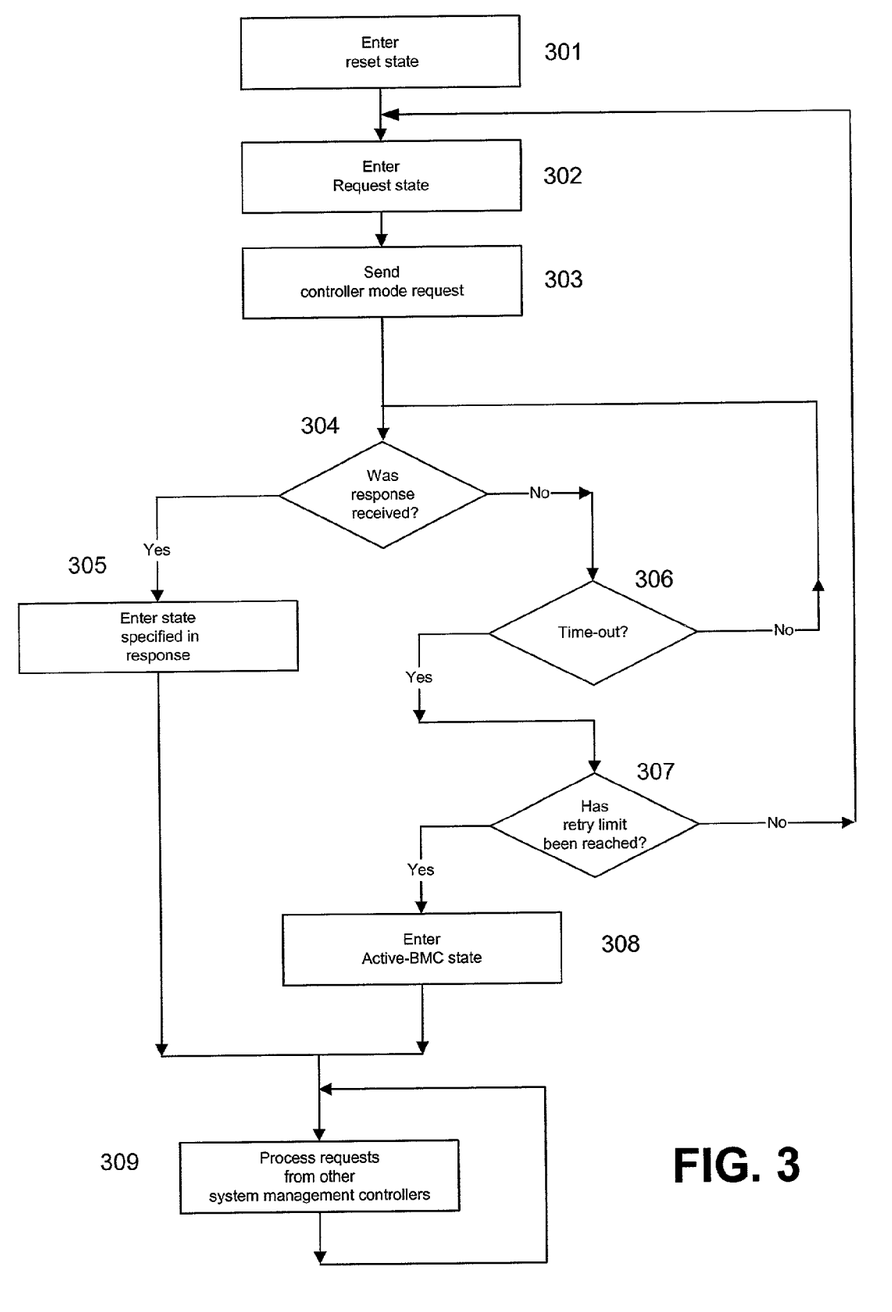
FIG. 3 is a flow diagram of a method of determining a management controller's initial operational mode according to an embodiment of the present invention.

FIG. 3 is a flow diagram of a method of determining a management controller's initial operational mode according to an embodiment of the present invention. This method may be performed, for example, by a system management controller (such as new system management controller 245 of FIG. 2) upon reset or other initiation of the system management controller. For example, new system management controller 245 may perform the method shown in FIG. 3 as part or its initiation routine. In the embodiment shown in FIG. 3 (and FIG. 6), the system management controller has a number of non-operational states in addition to the BMC, standby-BMC, and SMC modes discussed above. In particular, FIG. 3 shows the controller entering a request state (302). In an embodiment, the method illustrated in FIG. 3 is part of a controller mode negotiation protocol, and the method may be performed, for example, by the mode negotiation protocol instructions shown in FIG. 1.

In the embodiment shown in FIG. 3, the system management controller first is reset (301). Next, the system enters the request state (302). For example, new system management controller 245 may perform a controller initiation routine which starts by resetting the controller and enters the request state. While in request state, the controller sends a controller mode request message (such as controller mode request 260 of FIG. 2) (303). In an embodiment, the only feature of the request state may be the sending of the controller mode request. Next, the controller may wait for a response to the mode request (304). If a response is received within a timeout period (e.g., 100 ms), then the controller may enter the state specified in the response (305). For example, the new system management controller 245 may receive a GoToSMC response from another management controller in the system. After assuming the specified state, the system management controller may then process requests from other controllers (309) in addition to performing the functions of the operation mode that was assumed.

If a response is not received within a timeout period (e.g., 100 ms) (304 and 306), then the controller may determine if a retry limit has been reached (307). If the retry limit has not been reached, then the controller may transition back to request state, may send another controller mode request, and may wait as discussed above. In an embodiment, the retry limit may be three retries. Of course, other timeout periods and retry limits may be used. If the retry limit has been reached, the controller may set itself to active-BMC mode (308). After assuming BMC mode, the controller may then process requests from other controllers (309) in addition to performing the BMC functions. Thus, in this embodiment, if a controller does not receive a response to a controller mode request, it may assume the BMC mode. The priority may be based on any different factors such as, for example, those discussed below with reference to FIG. 5. In other embodiments, the protocol may not require each of the states shown or may include additional states. For example, the controller may not have a reset state. In addition, as discussed above, the assumption of a state may not require that the controller take any affirmative action.

In the example discussed above, all of the controllers but one have previously assumed an operational mode. However, the method shown in FIG. 3 is also applicable in other situations, such as when the entire system has been reset and all of the controllers are initialized at substantially the same time. According to an embodiment, when all of the controllers are initialized, they may each perform a method such as shown in FIG. 3 at substantially the same time. Thus, a number of management controllers in the system may each send a mode request to the other management controllers. Each of these controllers may then respond (or not respond) to each mode request that has been received, for example by sending a response message to the controller that sent the request. In an embodiment, it is determined that one of the controllers is initially the central management controller for the system based on the absence of a response to the mode request sent by that controller.

In a further embodiment, there is an absence of a response to a mode request if a threshold number of requests have been sent by the controller without receiving a response within a timeout period.

Figure 4:
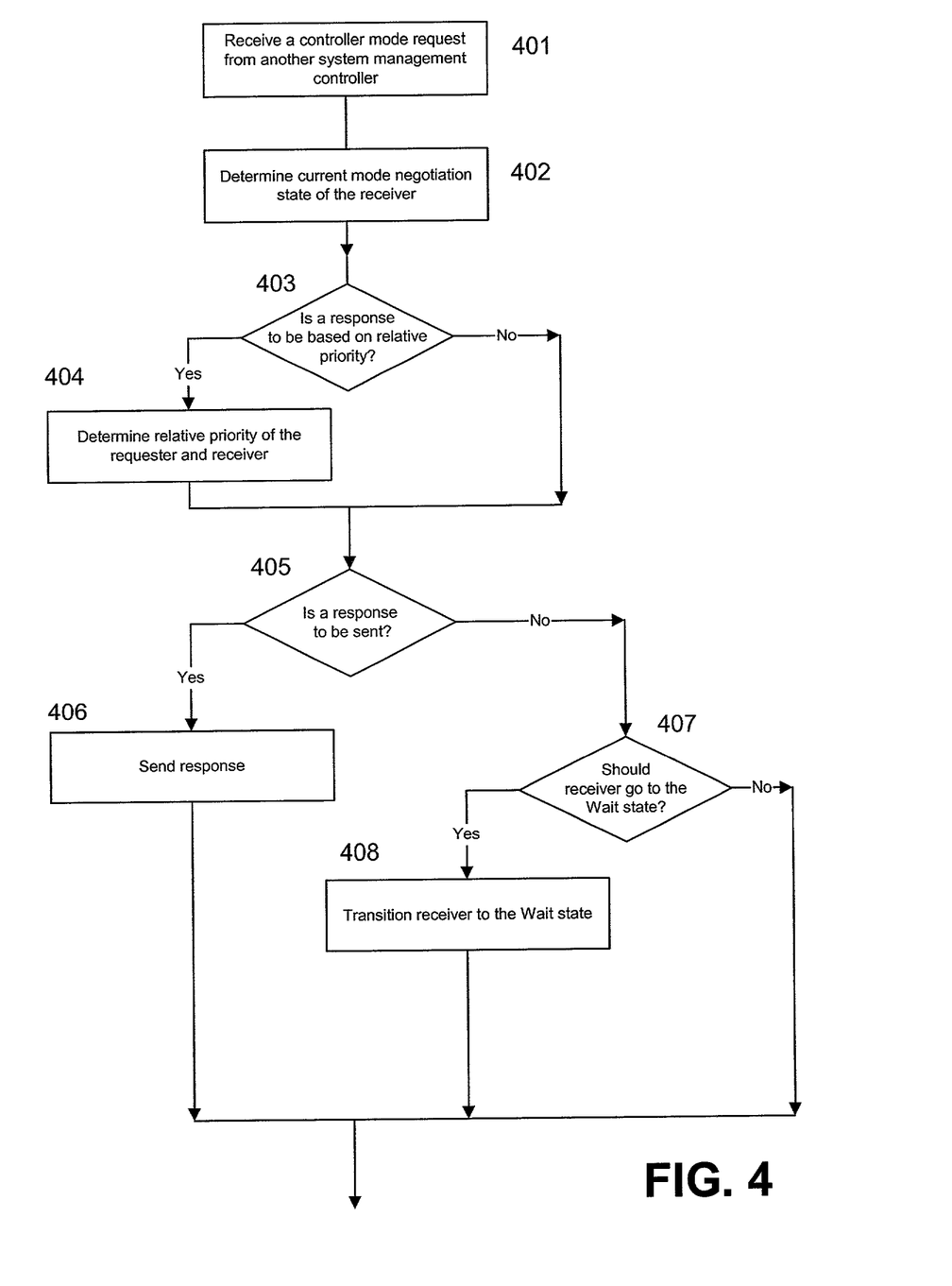
FIG. 4 is a flow diagram of a method of responding to a controller mode request according to an embodiment of the present invention.

FIG. 4 is a flow diagram of a method of responding to a controller mode request according to an embodiment of the present invention. This method may be performed, for example, by a system management controller upon receipt of a controller mode request (such as controller mode request 260 of FIG. 2 or controller mode request 510 of FIG. 5). In an embodiment, the method illustrated in FIG. 4 is part of a controller mode negotiation protocol, and the method may be performed, for example, by the mode negotiation protocol instructions shown in FIG. 1. This method may be performed by a controller before, after, or in parallel with the sending of a mode request by that controller (for example, as shown in the method of FIG. 3).

According to the embodiment shown in FIG. 4, a first system management controller (which may be referred to as the receiver) receives a controller mode request from a second system management controller (which may be referred to as the requester) (401). The receiver may then determine its current negotiation protocol state (402). For example, the receiver may determine that it is currently in the SMC mode. The receiver may then determine whether the mode negotiation protocol specifies that in this case the response be based on relative priority (403), and if so may determine the relative priority of the requestor and receiver (404). The receiver may then determine whether the mode negotiation protocol specifies that a response be sent in this case (405), and if so may send a response to the second system management controller (406). The response may specify a state that the second system management controller is to enter. If a response is not to be sent, the receiver may then determine whether the mode negotiation protocol specifies that the receiver transition to a Wait state in this case (407), and if so the receiver may transition itself to a Wait state (408). The relative priority may be determined as discussed below with reference to FIG. 5, and an example of an embodiment of a mode negotiation protocol for different cases is shown in FIG. 6 and in Table I below.

Thus, according to an embodiment of the invention, a response that is sent back to the sender of the controller mode request may be based at least in part on the current state of the receiver. The response may be based at least in part on the controller mode capabilities of the receiver and may be based at least in part on a user-configured mode preference. The method shown in FIG. 3 and in FIG. 4 may be performed as part of a controller initiation process. Although the operations of the method shown in FIG. 3 and in FIG. 4 are discussed in the order shown, in other embodiments some of the operations may be preformed in different orders. For example, a system management controller may send a controller mode request, and respond to one or more requests that it received, at substantially the same time.

Figure 5:
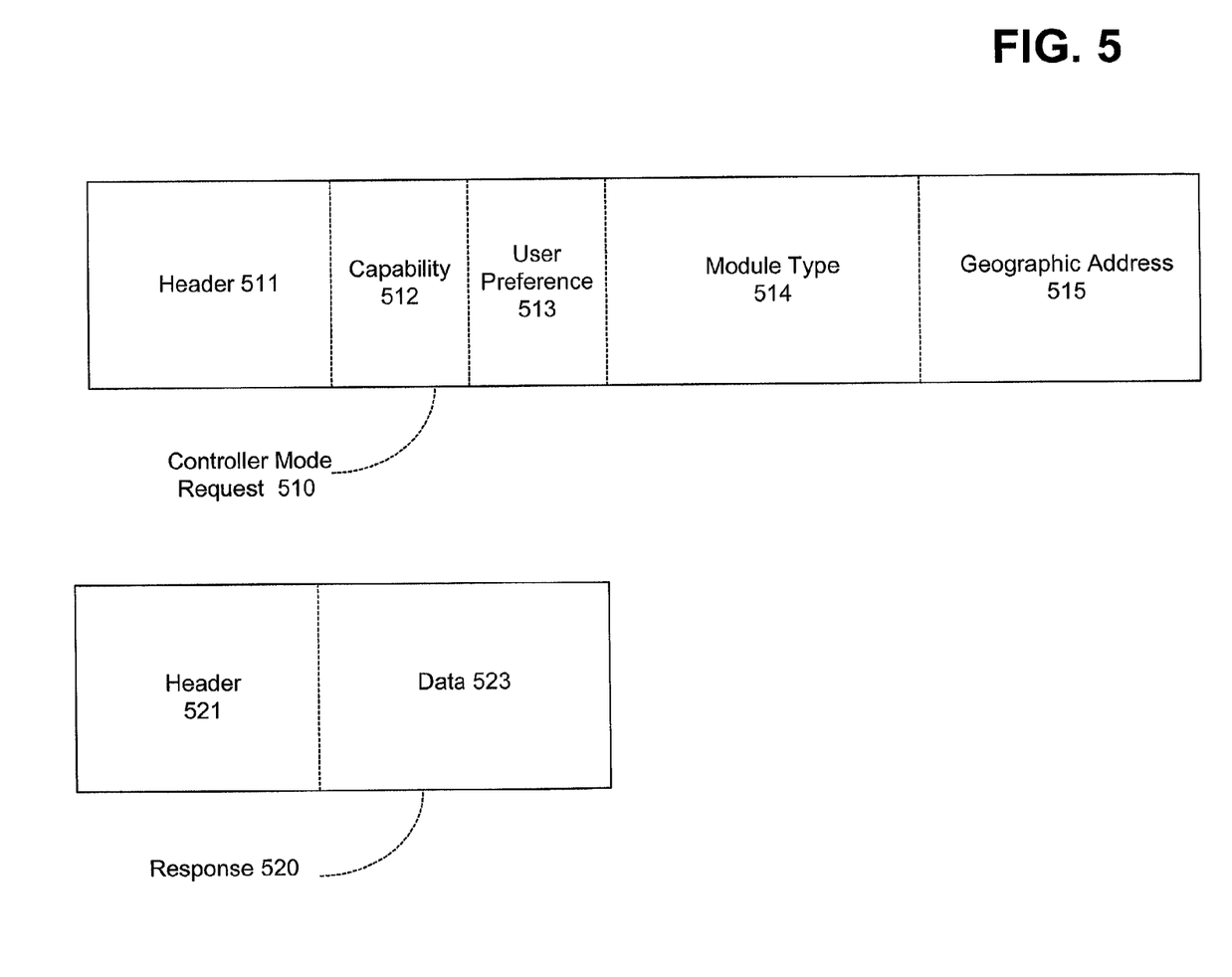
FIG. 5 is a block diagram of a controller mode request and a response according to an embodiment of the present invention.
Figure 6:
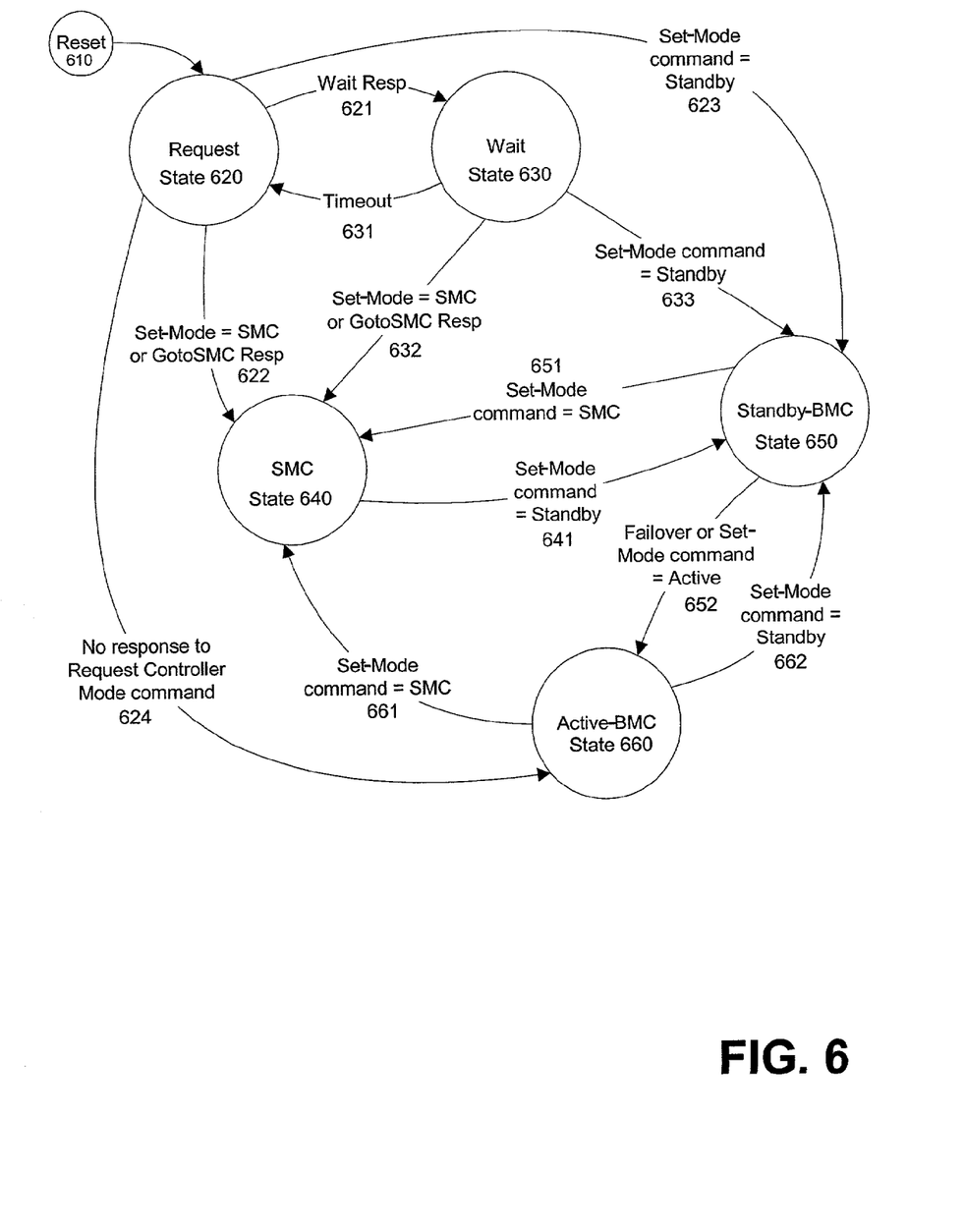
FIG. 6 is a state diagram that illustrates states and state transitions for a management controller negotiation protocol according to an embodiment of the present invention.

FIG. 5 is a block diagram of a controller mode request 510 and a response 520 according to an embodiment of the present invention. Controller mode request 510 may be for example controller mode request 260 of FIG. 2, and response 520 may be for example GoToSMC response 261 or Wait response 262 of FIG. 2. In an embodiment, controller mode request 510 and response 520 are messages that comply with the IPMI specification, in which case they may be referred to as commands. In an embodiment, controller mode request 510 and response 520 may use the group extension network function (e.g., network function=2Ch/2Dh) defined in the IPMI specification. As discussed above, controller mode request 510 and response 520 may be used for mode negotiation. In an embodiment, controllers may broadcast controller mode request 510 when they are in the request state and, after sending the controller mode request, may wait to receive responses.

As shown in FIG. 5, controller mode request 510 includes header 511, capability 512, user preference 513, module type 514, and geographic address 515 fields. In an embodiment, the information in controller mode request 510 may be used to determine relative controller priorities. In an embodiment, capability set is the first level priority check. In a further embodiment, if the capability set is equal, user-configured preference is used as a second level priority check. In a still further embodiment, if both capability set and user preference are equal, module type is used as a third level priority check. In a further embodiment, geographic address is used when the other criteria are tied. Of course, controller mode request 510 and response 520 are only examples of possible formats. The fields may be assigned other orders of priority for determining relative controller priority, and other fields may be used.

In an embodiment, the capability field 512 may indicate the system management mode capabilities of the controller that sends controller mode request 510. In an embodiment, available capabilities sets are BMC-Only, BMC/SMC, and SMC-Only. In a further embodiment, BMC-Only is the highest priority and SMC-Only is the lowest priority. In an embodiment, the only module which can be BMC-Only is a module that is dedicated to be the central management agent for the chassis, which may be referred to as a "Chassis Management Module" (CMM), and is designed for star or hybrid topologies.

In an embodiment, controllers with the BMC/SMC capability set (i.e., controllers that may act as either BMC or SMC) may optionally implement a user configuration feature to allow a user to specify a preference of BMC, SMC, or no preference. A user may input such preference using, for example, a BIOS set-up option, a software setting, a DIP switch, a jumper setting, or running or loading software. This information may be included in user preference field 513 of controller mode request 510. In an embodiment, modules that do not implement the user configuration preference feature, including BMC-Only and SMC-Only modules, may report no preference. In an embodiment, BMC-only is the highest priority, no preference is the middle priority, and SMC only is the lowest priority. Because different module types may have different geographic address domains, in embodiments module type may be used in determining prioritization. In an embodiment, different available values for the module type field 514, in order from lowest to highest priority, are power module, other chassis specific types, fan tray, node board, switch board, and dedicated CMM. Of course, other module types and other orders or priority may be used.

The geographic address field 515 may contain the geographic address (e.g., slot address) for the module of which the controller is a part. In an embodiment, when a comparison of other criteria results in a tie, the controller with the lower geographic address is determined to have the higher priority. In a further embodiment, controllers in the BMC states may also use the geographic address to decide how to respond. For example, BMCs may use geographic address to determine which module should be active after an initial power up.

As discussed above, controllers receiving a controller mode request may respond based on their current state and the requestor's priority relative to their own. FIG. 5 shows response 520 containing a header field 521 and a data field 523. In an embodiment, the header 520 contains a completion code. In an embodiment, the data field 521 may contain a wait response (which indicates that the receiver of the response should go to the Wait state) or a GoToSMC response (which indicates that the receiver of the response should go to the SMC state). In a further embodiment, the data field may also contain other responses such as standby-BMC. Of course, in other embodiments, the type and format of the messages may differ from that shown in FIG. 5. For example, additional messages may also be used by the mode negotiation protocol.

FIG. 6 is a state diagram that illustrates states and state transitions for a management controller negotiation protocol according to an embodiment of the present invention. According to an embodiment, a system management controller that is performing the negotiation protocol may be in one of the following negotiation states that are show in FIG. 6: request 620, wait 630, SMC 640, standby-SMC 650, and active-BMC 660. In this embodiment, a controller in the SMC state may be in the SMC mode, a controller in the standby BMC state may be in the standby-BMC mode, and a controller in the active BMC state may be in the active-BMC mode. In an embodiment, some controllers will support all five of these states while others will only support a subset of the states. The SMC-only state may be the only state available to a controller that is only capable of operating in the SMC-only mode, the BMC-only state may be the only state available to a controller that is only capable of operating in the BMC-only mode, and all five states may be available to a controller that is capable of operating in either SMC or BMC mode. In FIG. 6, reset 610 may signify that the controller has undergone a reset condition (i.e., the condition at a controller reset or initiation).

In an embodiment, when a controller comes out of reset, it enters the request state 620. In the request state, the controller may broadcast a controller mode request and wait for responses. Other controllers receiving the controller mode request may respond according to their current state and relative priority to the requestor. According to an embodiment, the negotiation protocol supports prioritization so modules that are not capable of acting as SMCs will take precedence as the BMC over modules that are capable of acting as SMCs. BMC priority may be based on capabilities, preference settings, module type, and geographic address. In an embodiment, if no response is received to the controller mode request (after retries), the requestor may set itself to the active-BMC mode. Otherwise the requester may be told what mode to run in via either a GoToSMC response. In an embodiment, the controller may also receive an unsolicited message which was not sent in response to a particular controller mode request and which requests that the controller assume a certain mode. Such an unsolicited message may be referred to as a set mode command. In an embodiment, set mode commands are sent by a BMC during operation of the system to make changes to controller modes after initial modes have been assumed.

The various state transitions according to embodiments of the invention will now be described in more detail. After a controller in the request state broadcasts a controller mode request it may receive one or more responses such as a GoToSMC response (622) or a wait response (621). If a GoToSMC response is received, the controller may transition to the SMC state (640). If a wait response is received, the controller may transition to the Wait state (630). If no response is received after timeouts and retries, the controller may transition to the Active BMC state (624). In addition, a controller in the request state may receive one or more set mode commands that may instruct the controller to go the standby-BMC mode (623) or may instruct the controller to go the SMC mode (622).

In the embodiment shown, a controller that is in the Wait state 630 may wait to receive a set mode command or a GoToSMC response. If a GoToSMC response is received, the controller may transition to the SMC state (632). If a set mode command is received the controller may transition to the appropriate state specified in the set mode command (e.g., transitions to standby-BMC state 633 or transitions to SMC state 632). In this embodiment, if neither a GoToSMC response nor a set mode command is received within a timeout period, the controller may transition back to the request state (631), where it may re-broadcast the controller mode request.

A controller in the SMC state may act as a satellite management controller. As shown in FIG. 6, if a set mode command is received by a controller in the SMC state, the controller may transition to the appropriate state specified in the set mode command (e.g., transition to standby-SMC state 641).

A controller in the Standby BMC state may act as a standby BMC. As discussed above, in an embodiment a controller in the standby BMC state may maintain synchronized state information with the active BMC and may perform a watchdog function for the active BMC. In a further embodiment, the standby BMC shall transition to the active BMC state (652) if the active BMC fails. Depending on the management topology and installed modules, a new standby BMC may be selected upon a failure of the active BMC. As shown in FIG. 6, if a set mode command is received by a controller in the standby-BMC state, the controller may transition to the appropriate state specified in the set mode command (e.g., transition to SMC state 651 or transition to active-BMC state 652).

In the active-BMC state, the controller may performs normal BMC functions. In an embodiment, the active BMC may select a standby BMC that is appropriate for the topology, and may synchronizes state information with the standby BMC. In the embodiment discussed above, the BMC(s) are ultimately responsible for telling the other negotiating controllers to go to the SMC state. In one embodiment, for example where a dual bus topology is used, the controllers may be only told to go to SMC mode by a BMC after a standby BMC has been established. In this embodiment, controllers are prevented from reaching the SMC state before a standby BMC is be established. If the active BMC were to fail before establishing a standby and all other controllers had reached the SMC state, the system may be left without a BMC. In an embodiment, CMMs that are specifically designed for star or hybrid topologies may tell other non-CMM modules to go to the SMC state prior to establishing a standby CMM, because only another star or hybrid CMM can be the standby BMC. In an embodiment, the active-BMC may transition to the standby-BMC state upon receipt of a standby set mode command (662), which may occur for example when there is a user-triggered switch of the standby-BMC to active BMC mode (which may be knows as a "failover"), if a controller of a priority higher than the standby-BMC is hot-swapped in, or for other reasons.

According to an embodiment, controllers receiving a controller mode request (i.e., the receiver) may respond to the requestor (i.e., the controller that sent the request) as shown in the following Table I. This table shows 15 different cases. As shown below, the response may be based on the receiver's state and the requestor's relative priority. In some cases the response depends upon the requestor's relative geographic priority, and in some cases the response depends upon whether a standby-BMC has already been established. In Table I, the designation "X" indicates that for this case the content of the response is not based on this criteria. Relative controller priorities may be determined based on capability, user preference, module type, and geographic address (GA) as discussed, for example, with regard to FIG. 5.

TABLE I

| Case | Receiver State | Requestor's Priority w/o GA | Requestor's GA Priority | Establish a Standby | Response |
|---|---|---|---|---|---|
| 1 | Active BMC | Higher | X | X | Wait |
| 2 | Active BMC | Equal or lower | X | Yes | Wait or GotoSMC |
| 3 | Active BMC | Equal or lower | X | No | Wait (or GotoSMC)[1] |
| 4 | Standby BMC | Higher | X | Yes | Wait |
| 5 | Standby BMC | Equal | X | Yes | Wait or GotoSMC |
| 6 | Standby BMC | Lower | X | Yes | GotoSMC |
| 7 | SMC | X | X | X | No Response |
| 8 | Wait | Higher | X | X | No response |
| 9 | Wait | Equal | Higher | X | No response |
| 10 | Wait | Equal | Lower | X | Wait |
| 11 | Wait | Lower | X | X | Wait |
| 12 | Request | Higher | X | X | No response and set self to Wait |
| 13 | Request | Equal | Higher | X | No response and set self to Wait |
| 14 | Request | Equal | Lower | X | Wait |
| 15 | Request | Lower | X | X | Wait |

In the first three cases in Table I, the receiver of the controller mode request is the active-BMC. If the requestor's priority (without geographic address) is higher than the receiver's priority, then a wait response may be sent. Examples of situations where the requestor may have a higher priority than the active BMC is where the requestor was hot-swapped in or where the requestor took a relatively long time to come out of rest. A requester with a higher priority than the active BMC may be sent to the Wait state, rather than directly becoming the active-BMC, so that it may become synced before changing to the active-BMC. If the requestor's priority (without geographic address) is equal or lower than the receiver's priority, and a standby-BMC has been established, then a wait response or GoToSMC response may be sent. The wait response may be issued if the requestor is to become the new standby-BMC. If a standby-BMC has not been established, then in an embodiment the receiver may only issue a GoToSMC response if the active BMC is a CMM specifically designed for a star or hybrid topology and the requestor is not a CMM; otherwise, the receiver may issue a wait response.

In cases 4–6 of Table I, the receiver is in the standby-BMC state (which by definition means that a standby-BMC was established). In the embodiment shown, a wait response may be sent if the requestor's priority (without geographic address) is higher than the receiver's priority, and a GoToSMC response may be sent if the requestor's priority (without geographic address) is lower than the receiver's priority. A GoToSMC response will generally be sent if the requestor's priority (without geographic address) is equal to the receiver's priority, but wait response may be sent in this case when, for example, there has been a decision made to change the standby-BMC.

In the remaining cases 7–15 in Table I, the response is not dependent upon whether a standby has been established. In case 7, the receiver is in the SMC state, and no response is sent regardless of relative priority. Thus, in this embodiment a controller in the SMC state does not respond to a controller mode request. In cases 8–11, the receiver is in the Wait state, and the geographic priority is used to break ties. In these cases, no response is sent if the requestor has a higher priority, and a wait response is sent if the requestor has a lower priority. Finally, in cases 12–15, the receiver is in the request state, and the geographic priority is used to break ties. In these cases, if the requestor has a higher priority, no response is sent and the receiver sets itself to the Wait state. If the receiver is in the request state and the requestor has a lower priority, a wait response is sent.

Table I represents only one embodiment of a negotiation protocol according to the present invention. In other embodiments, other receiver states may be available, and the responses may be different in one or more of the cases.

In embodiments disclosed above, a controller that does not receive any responses to the controller mode request and to retries (and has not set itself to the Wait state) may set itself to the active BMC state. In the embodiment shown, controllers are only told to go to SMC mode by a BMC when there is an established standby-BMC to prevent controllers from reaching the SMC state before a standby BMC can be established. If the active BMC were to fail before establishing a standby, and all other controllers had reached the SMC state, the system may be left without a BMC. Use of the mode negotiation protocol disclosed in embodiments of the present invention may automatically determine which controllers will be the active and standby BMCs while avoiding conflicts between controllers.

Several examples of embodiments of the present invention are specifically illustrated and/or described herein. However, it will be appreciated that modifications and variations of the present invention are covered by the above teachings and within the purview of the appended claims without departing from the spirit and intended scope of the invention. For example, the priority determination and protocol for responding to a request may differ from that shown above. As another example, the system management negotiation protocol may be embodied in hardware or software.

What is claimed is:

1. A method for determining a baseboard management controller mode, the method comprising:
    sending mode requests from a plurality of system management controllers in a computer system to other system management controllers in the computer system; and
    determining one of the system management controllers to be a baseboard management controller based on the absence of a response to a mode request sent by that system management controller,
    wherein the method further comprises sending from a first of the system management controllers a response to a mode request received from a second of the system management controllers, wherein the response by the first management controller is based at least in part upon a negotiation protocol state of the first system management controller,
    wherein the mode requests and responses are sent as messages that comply with the Intelligent Platform Management Interface specification.

2. The method of claim 1, wherein the response by the first management controller is based at least in part upon the relative priority of the first and second system management controllers.

3. The method of claim 2, wherein the priority is based on at least one of a controller mode capability, a user preference, a controller's module type, or a controller geographical address.

4. The method of claim 3, wherein controller geographical address is the last factor considered in determining priority.

5. The method of claim 1, wherein the method further comprises determining the mode of the second system management controller based at least in part on the content of the response.

6. The method of claim 1, wherein the method is performed as part of a controller initiation processes.

7. The method of claim 1, wherein there is an absence of a response to a mode request if a threshold number of requests have been sent by the controller without receiving a response within a timeout period.

8. The method of claim 7, wherein a system management controller that does not receive a response to a controller mode request within a time-out period retries the request at least once before determining that the system management controller is to be the baseboard management controller.

9. The method of claim 1, wherein the mode requests contain information relating to the operational modes in which the controller sending the request is capable of operating.

* * * * *

UNITED STATES PATENT AND TRADEMARK OFFICE
CERTIFICATE OF CORRECTION

PATENT NO. : 7,058,703 B2
APPLICATION NO. : 10/092793
DATED : June 6, 2006
INVENTOR(S) : Hawkins It is certified that error appears in the above-identified patent and that said Letters Patent is hereby corrected as shown below:

On Title Page   Col. 1, in field (54), in "Title", in column 1, line 4, delete "SMCS" and insert - - SMCs - -, therefor.

On Title Page   Col. 2, in field (56), under "U.S. Patent Documents", in column 2, line 4, after "6,823,397" delete "B1 *" and insert - - B2 * - -, therefor.

On Title Page   Col. 2, in field (56), under "U.S. Patent Documents", in column 2, line 5, after "6,920,554" delete "B1 *" and insert - - B2 * - -, therefor.

On Title Page   Col. 2, in field (56), under "U.S. Patent Documents", in column 2, line 6, after "6,948,008" delete "B1 *" and insert - - B2 * - -, therefor.

On Title Page, in field (56), under "Other Publications", in column 2, lines 2–3, delete "Operations,"no date." and insert - - Operations". - -, therefor.

On Title Page, in field (74), in "Attorney, Agent, or Firm", in column 2, line 1, delete "Grossmanm" and insert - - Grossman, - -, therefor.

In column 1, line 4, delete "SMCS" and insert - - SMCs - - , therefor.

In column 3, line 27, delete "by" and insert - - be - -, therefor.

In column 3, lines 34–35, delete "(Ver. 2.0, August. 2000)" and insert - - (Ver. 2.0, Aug. 2000) - -, therefor.

UNITED STATES PATENT AND TRADEMARK OFFICE
CERTIFICATE OF CORRECTION

PATENT NO. : 7,058,703 B2
APPLICATION NO. : 10/092793
DATED : June 6, 2006
INVENTOR(S) : Hawkins It is certified that error appears in the above-identified patent and that said Letters Patent is hereby corrected as shown below:

In column 5, line 1, after "capable" delete "or" and insert - - of - -, therefor.

In column 5, line 2, delete "or" and insert - - of - -, therefor.

In column 5, line 4, after "capable" delete "or: and insert - - of - -, therefor.

In column 7, line 64, delete "preformed" and insert - - performed - -, therefor.

Signed and Sealed this

Eighth Day of August, 2006

JON W. DUDAS
*Director of the United States Patent and Trademark Office*